United States Patent [19]

Seetharaman et al.

[11] Patent Number: 5,571,248
[45] Date of Patent: Nov. 5, 1996

[54] PRESSURE REGULATOR

[75] Inventors: Viswanath Seetharaman, Anderson; Dale L. Baldauf, Pendleton, both of Ind.

[73] Assignee: General Motors Corporation, Detroit, Mich.

[21] Appl. No.: 402,216

[22] Filed: Mar. 10, 1995

[51] Int. Cl.$^6$ ............................ F15B 13/044; F16K 31/06
[52] U.S. Cl. ................................ 137/625.65; 251/129.08; 335/262
[58] Field of Search ................ 137/625.65; 251/129.08; 335/262

[56] References Cited

U.S. PATENT DOCUMENTS

| | | | |
|---|---|---|---|
| 4,250,922 | 2/1981 | Will et al. | 137/625.65 |
| 4,442,998 | 4/1984 | Ohyama et al. | 251/129.08 |
| 4,643,225 | 2/1987 | Imhof | 137/625.65 X |
| 4,662,605 | 5/1987 | Garcia | 251/129.08 |
| 4,783,049 | 11/1988 | Northman et al. | 137/625.65 X |
| 4,947,893 | 8/1990 | Miller et al. | 137/625.65 |
| 5,191,827 | 3/1993 | Kervagoret | 137/625.65 X |

FOREIGN PATENT DOCUMENTS

| | | | |
|---|---|---|---|
| 1-242884 | 9/1989 | Japan | 137/625.65 |
| 1-261581 | 10/1989 | Japan | 137/625.65 |
| 2-138583 | 5/1990 | Japan | 137/625.65 |
| 2186349 | 8/1987 | United Kingdom | 137/625.65 |

OTHER PUBLICATIONS

"Toyota Develops Linear Hydraulic ABS", Japan Autotech Report, vol. 151, pp. 22–24, Sep. 5, 1992.

Primary Examiner—Gerald A. Michalsky
Attorney, Agent, or Firm—Jeffrey A. Sedlar

[57] ABSTRACT

A pressure regulator in the form of a proportional pressure control solenoid provides predictable and repeatable control of pressure in response to an electrical input signal. The pressure regulator converts the electrical control signal to an output pressure at the load independent of the flow requirements. The electromagnetic portion of the pressure regulator generates a force proportional to the average current supplied by a controller and applies that force to the hydraulic components of the device. The hydraulic components include a spool and a feedback pin which apply a pressure feedback force to the solenoid.

8 Claims, 2 Drawing Sheets

PRESSURE REGULATOR

BACKGROUND OF THE INVENTION

The present invention relates to valves for the regulation of hydraulic pressure. More particularly, the invention is directed to proportional pressure control solenoid valves.

A conventional method for designing accurate and repeatable pressure regulators which may be subjected to substantial forces generated at operating pressures reaching 2000 psi involves the use of expensive techniques to reduce drag between the solenoid's armature and other magnetic components. This results in a relatively expensive assembly. The typical generation of large forces along the axis of motion of an armature in such conventional devices is usually accompanied by the existence of a large radial force that pulls the armature in a direction perpendicular to the direction of motion. This results in the armature dragging substantially due to the friction existing between the armature and the support bearing. The radial force is directly proportional to the magnitude of the lateral force on the armature and the coefficient of friction between the two surfaces.

This undesirable drag results in a difference in the net axial force produced by the armature on the hydraulic components of a conventional electro-hydraulic pressure regulator in the increasing and decreasing force directions of its operation. This problem has typically been solved by the use of roller or other specialized bearing devices that reduce the effective coefficient of friction between the two surfaces. This conventional solution however, results in a relatively expensive device and complicates the assembly. It also renders these devices sensitive to both contamination and degradation of their repeatability.

In pressure regulators incorporating sliding member valves a conventional method of reducing the inherent leakage through the clearance between the sliding spool and the housing is through the use of very close tolerance components. This tends to render the valves expensive, temperature sensitive and subject to an inherent phenomenon called limit cycling. Limit cycling is associated with devices that have a large change in flow gain as they overcome a positive overlap between the spool and the housing. The limit cycling related initial surge of flow that occurs when such a conventional valve opens is undesirable in many applications.

The typical cost and complication involved in manufacturing a conventional pressure regulator capable of operating with high actuation force and of relatively small size has limited the use of such devices. This in turn has hampered the development of pressure regulator based systems in high pressure applications such as brakes and power steering in the automotive industry.

SUMMARY OF THE INVENTION

The present invention provides a pressure regulator in the form of a proportional pressure control solenoid valve that provides predictable and repeatable control of output pressure based on an electrical control signal. The pressure regulator converts the electrical control signal to an output pressure independent of the flow requirement. The electromagnetic portion of the device generates a force proportional to the input signal supplied by a controller and applies that force to the hydraulic components of the device.

In the electro-mechanical portion of the pressure regulator a unique bearing configuration is used to support the moving armature. The use of a combination of sleeve and ring shaped bearings closely centers the armature with respect to primary and secondary plates. The centering of the armature achieves two purposes. First, there is a reduction in reluctance of the magnetic circuit to the flow of magnetic flux. This allows a large magnetic force to be generated by the application of a relatively small magneto-motive force. Second, the accurate centering reduces the total lateral force on the armature. The centering leads to the radial forces on the armature being of nearly equal magnitude in all directions. This leads to a canceling out of the majority of the lateral force. As a result, the electro-mechanical portion of the pressure regulator operates with contact surfaces between the armature and bearings having a much higher coefficient of friction than conventional devices without the resulting undesirable drag.

The hydraulic components of the pressure regulator include a sliding spool and a pressure feedback pin which are carried in a housing. The pressure regulator's output pressure force is applied to the pin and is balanced by the reaction of the pin against the housing. The unbalanced hydraulic force that is produced by the output pressure and which acts upon an area of the spool substantially equal to the area of the pin provides feedback that works to return the spool to a closed position. This force is balanced by the electromagnetic force applied to the spool by the armature.

In addition to the above-mentioned features the pressure regulator is preferably driven by a unique electrical input signal. The signal is a pulse width modulated voltage of low frequency. The rising current in the coil is dependent on the voltage applied at the time of rise in the electrical self inductance of the magnetic circuit. The dropout of the current after the applied voltage has been dropped to zero is aided by the use of a zener diode. This results in a rapid decrease in the value of current in the pressure regulator thereby resulting in a rapid drop in the electromagnetic force produced in the armature. Therefore, a periodic motion of the armature results from the periodic drop of force and the resulting dynamic imbalance of the forces on the armature. This armature movement also known as dither effectively reduces whatever hysteresis would otherwise arise out of the static drag of the armature against the bearing surfaces.

The invention provides a cost effective predictable and repeatable pressure regulator which enables the broader application of this technology. The unique combination of features in the invention makes it an effective alternative for use in both high pressure, e.g., 1000 psi and upwards, and low pressure, e.g., below 300 psi, applications.

DETAILED DESCRIPTION OF THE PRESENTLY PREFERRED EMBODIMENT

Figure 1:
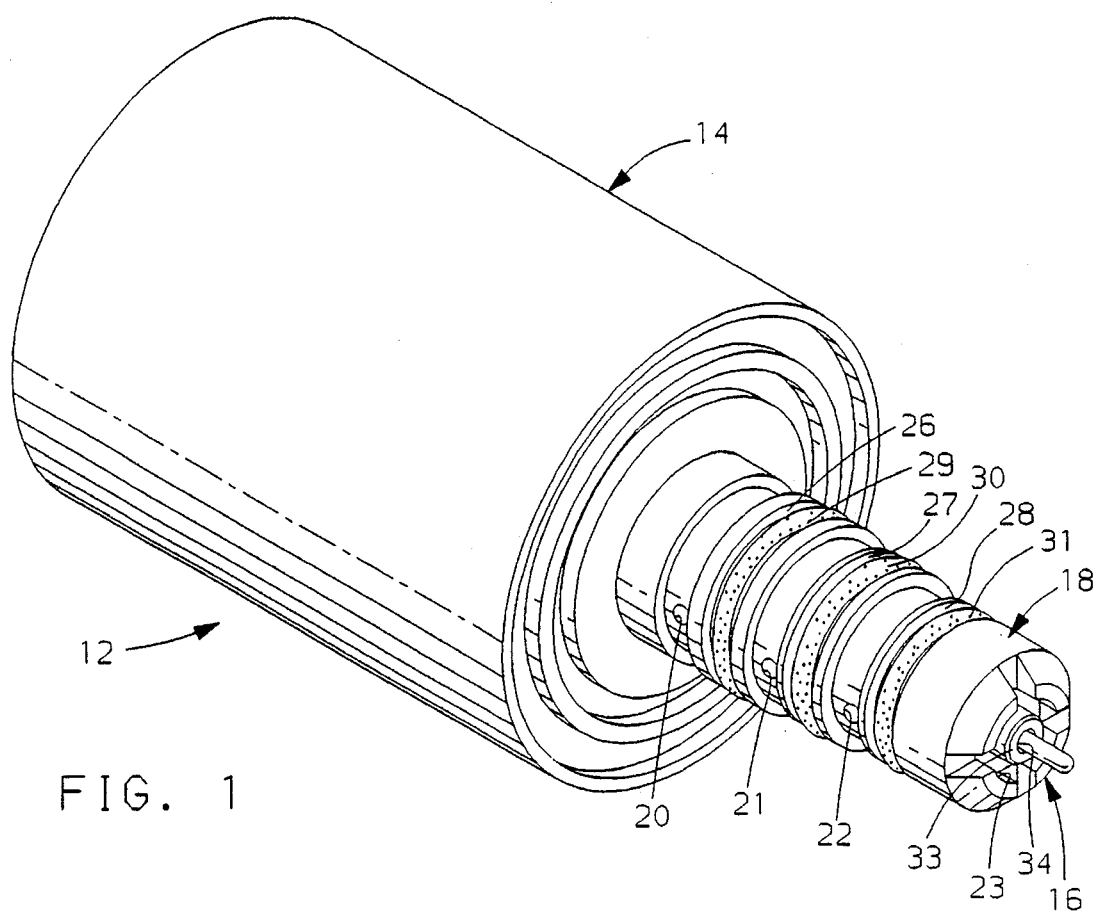
FIG. 1 is a perspective view of a pressure regulator according to the present invention.

Referring to the drawings, illustrated in FIG. 1 is pressure regulator 12. Pressure regulator 12 consists of integral actuator assembly 14 and valve assembly 16 which comprise a compact packaged unit. Pressure regulator 12 is configured for installation in a module 50 (FIG. 2), to provide flow passageways to and from the ports 20–23.

Port 22 provides a point for a supply of fluid to enter valve assembly 16. Port 21 provides a point for output flow from valve assembly 16. Port 20 provides a point for exhaust fluid returning to valve assembly 16 through output port 21 to exit the valve assembly 16. Opening 23 provides a point for fluid leakage past the spool to exit valve assembly 16 and return to the system exhaust.

The valve assembly 16 includes housing 18 which is configured with an increasingly larger diameter stepped construction between the series of valve ports. Located between each adjacent pair of valve ports is an annular groove containing an O-ring seal. Annular grooves 26, 27 and 28 contain O-ring seals 29, 30 and 31 to maintain fluid separation between the flow ports when pressure regulator 12 is inserted into module 50.

Figure 3:
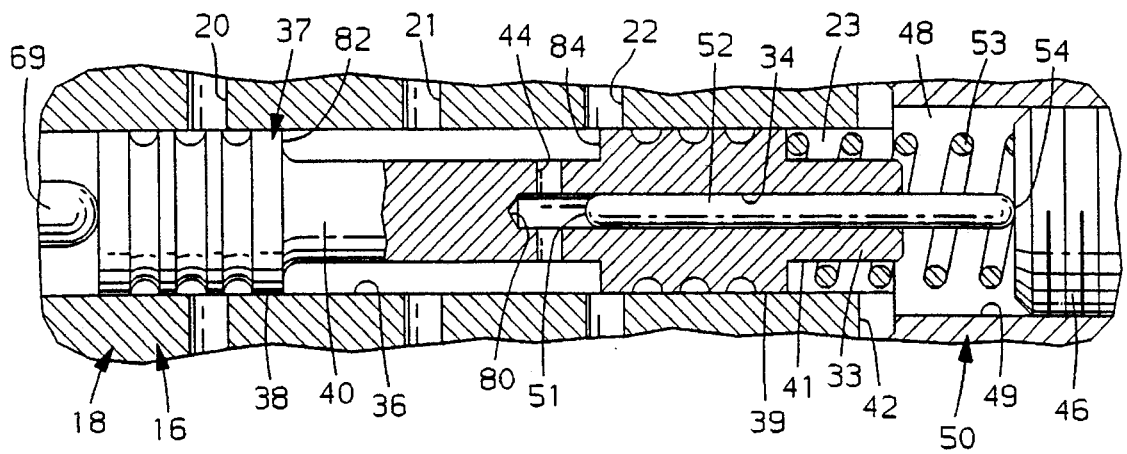
FIG. 3 is a fragmentary, cross-sectional view of the sliding member of a pressure regulator.

Partially extending through opening 23 is the end 33 of a valve spool. The end 33 includes bore 34 for carrying a feedback pin. The valve spool and feedback pin are better illustrated in FIG. 3.

Figure 2:
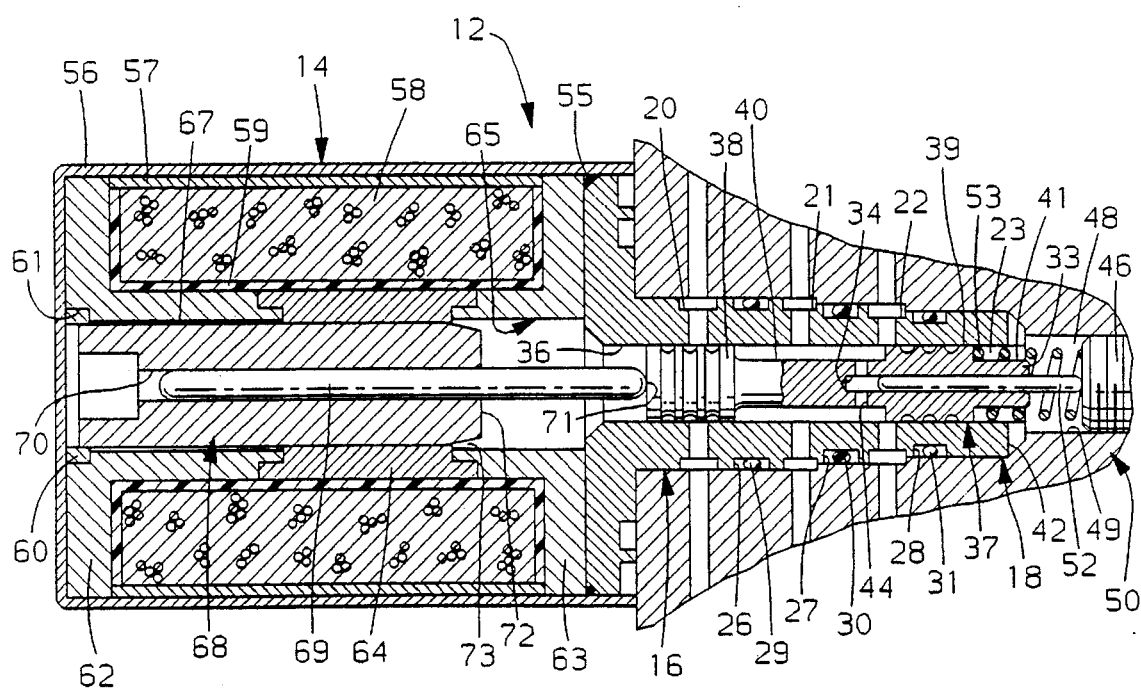
FIG. 2 is a schematic, cross-sectional representation of a pressure regulator according to the present invention.

Referring to FIG. 2, the valve housing 18 includes bore 36 in which spool 37 is slidably contained. Spool 37 includes land 38 and land 39. Between lands 38 and 39 undercut 40 forms an annular groove around the spool 37. Undercut 41 forms a nipple at the end 33 of spool 37 adjacent the land 39. Cross bore 44 extends through valve spool 37 in the area of undercut 40 and intersects with bore 34.

Pressure regulator 12, as illustrated in FIG. 2, is fixed in cavity 49 of module 50. Plug 46 is selectively positioned and fixed in cavity 49 forming a chamber 48 adjacent the end 42 of valve assembly 16. Feedback pin 52 is partially disposed in bore 34 and extends from the end 33 of spool 37 through chamber 48 and contacts plug 46. Return spring 53 also bears against plug 46 and extends through chamber 48 and onto spool 37 about undercut 41. Extending through housing 18 and module 50 are flow passages for supply at supply port 22, output at output port 21 and exhaust at exhaust port 20 and exhaust opening 23.

Actuator assembly 14 is fixed to housing 18 and an O-ring seal 55 is disposed therebetween. Actuator assembly 14 includes frame 56 which comprises a cylindrical can for housing the actuator. Carried in the frame 56 is a coil 58 which comprises a plurality of turns of wire wound on a bobbin 59. Positioned between coil 58 and frame 56 is sleeve 57.

Rear bearing 60 is fixed in step 61 of secondary plate 62. Rear bearing 60 is ring-shaped and preferably made of brass. Positioned at the opposite end of coil 58 from secondary plate 62, within frame 56, is primary plate 63. Positioned inside coil 58, between secondary plate 62 and primary plate 63, is sleeve bearing 64 which is preferably made of brass. Primary plate 63, sleeve bearing 64, secondary plate 62 and rear bearing 60 form a cylindrical, axial opening 65 which extends substantially through actuator assembly 14. The axial opening 65 is slightly smaller in diameter at sleeve bearing 64 and rear bearing 60 than it is at secondary plate 62 and primary plate 63. This maintains a slight air gap 67 between armature 68 and secondary plates 62. (The illustrated size of the air gap 67 is exaggerated). Rod 69 is fixed in axial opening 70 of armature 68 and includes end 71 that contacts spool 37.

In operation, actuator assembly 14 generates a force proportional to the average current supplied by a controller (not illustrated) and applies that force to the hydraulic components of the valve assembly 16. The armature 68 is provided with an included angle of sixteen degrees, adjacent end 72. This particular angle, for a predetermined length, provides actuator assembly 14 with a magnetic force that is only proportional to the current applied to the coil 58 and is independent of the position of the armature 68 in the magnetic circuit for a considerable distance. This feature provides for the ability to use significant positive overlaps between the spool 37 and the supply port 22 and exhaust port 20. This provides a means of reducing the leakage pass the spool 37 through the valve assembly 16.

The configuration of sleeve bearing 64 and rear bearing 60 to support the moving armature 68 provides a means of precisely centering the armature 68 with respect to the primary plate 63 and secondary plate 62. The magnetic circuit of actuator assembly 14 comprises coil 58, sleeve 57, primary plate 63, armature 68 and secondary plate 62. Integral in the magnetic circuit is the primary air gap 73 between primary plate 63 and the armature 68 at the included sixteen degree angle and the secondary air gap 67 between secondary plate 62 and armature 68. The precise centering of armature 68 provided by sleeve bearing 64 and rear bearing 60 permits minimizing the secondary air gap 67 and thereby reducing the reluctance of the magnetic circuit to the flow of the magnetic flux. This enables the generation of a large magnetic force by the actuator assembly 14 through the application of a relatively small magneto-motive force generated by current in the coil 58. Accurate centering also reduces the total lateral force on the armature 68. The radial forces on armature 68 are of nearly equal magnitude in all radial directions which leads to canceling out of the majority of the lateral force. Therefore, the use of brass bearings to guide the armature 68 without an undesirable amount of drag resulting is made possible. In the present embodiment, adequate centering is provided with a total diametral clearance between sleeve bearing 64 and armature 68 of 0.05 to 0.15 mm. This maintains an operative secondary air gap 67 with a total diametral clearance between secondary plate 62 and armature 68 of 0.30 to 0.40 mm.

The signal used to energize coil 58 is a pulse width modulated voltage of low frequency in the neighborhood of 15–35 hertz. The rise in current in coil 58 is dependent on the voltage applied, the time of rise and the electrical self inductance of the magnetic circuit. The dropout of current after the applied voltage has been dropped to zero is aided by the use of zener diode.

Figure 4:
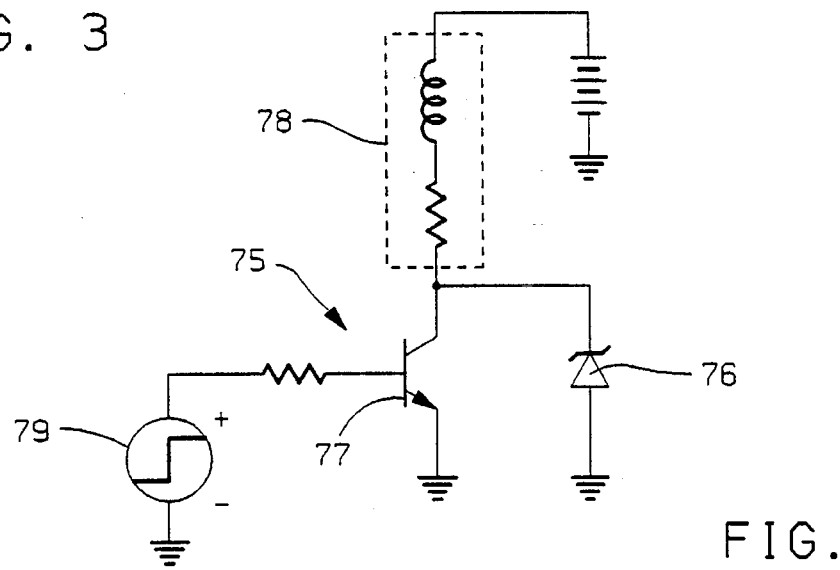
FIG. 4 is a simplified electrical circuit illustrating the use of a zener diode to aid in current dropout.

A simplified circuit showing use of a zener diode 76 to aid in the quick dropout of current is illustrated in FIG. 4. The zener diode 76 is connected in the circuit 75 between the drive transistor 77 and the solenoid coil 78. The zener diode 76 applies a large negative spike of voltage at the time of current dropout on the cessation of a pulse from driver signal 79. This results in a rapid decrease in the value of current in the solenoid thereby resulting in a rapid drop in the electromagnetic force produced in the armature 68. As the periodic drop in force occurs a dynamic imbalance in the forces on the armature 68 results which gives a periodic motion to the armature 68. The return of the pressure regulator's moving parts during the periodic movement is also aided by the force of the return spring 53. This movement, also known as dither, effectively reduces the hysteresis which would otherwise arise out of the static drag of the armature 68 against the surfaces of sleeve bearing 64 and rear bearing 60.

The hydraulic components of the valve assembly 16 are designed to regulate the output pressure in the load and to utilize the output pressure to operate. As illustrated in FIG.

3, the output pressure which exists about undercut 40 is communicated through cross bore 44 and into bore 34. In bore 34 the output pressure force produced on end 51 of feedback pin 52 is balanced by the reaction of plug 46 against end 54 of feedback pin 52. Of the forces acting on spool 37 the exhaust pressure in chamber 48 is essentially zero. The force of the return spring 53 is relatively very light and therefore is essentially zero.

The force of the output pressure works against valve land 38 at annular surface 82, attempting to force spool 37 to the left and against valve land 39 at annular surface 84, attempting to force spool 37 to the right. These forces operate to cancel each other out. The result is an unbalanced hydraulic force resulting from the output pressure that acts upon the area of the spool at the left end 80 of bore 34 which is essentially equal to the cross-sectional area of the feedback pin 52. This unbalance hydraulic force is the feedback force that attempts to return the spool 37 to the closed position. When the actuator assembly 14 is deenergized this force operates to cutoff the supply fluid to supply port 22 and cease pressure buildup in the load through the output port 21. When the actuator assembly 14 is energized, the unbalanced hydraulic feedback force is opposed by the electromagnetic force exerted on spool 37 by rod 69.

The electromagnetic portion of pressure regulator 12 generates a force according to the control signal received from the controller. The spool 37 is displaced toward the supply port 22 to open a flow passage between supply port 22 and output port 21. This causes a controlled rate of high pressure supply fluid to flow to the load through the output port 21 raising the pressure in the load. The use of feedback pin 52, which is of a reduced cross-sectional area in relation to spool 37, allows actuation of the device as a servo-controlled device without the penalty of needing to overcome the substantial forces generated at operating pressures of approximately 2000 psi, acting on the total area of spool 37.

The combination of the magnetic configuration and the pressure feedback signal renders the pressure regulator 12 highly repeatable and accurate. The design of the feedback pin 52 results in an inexpensive manufacturing process and a structurally robust arrangement for pressure feedback. This also eliminates the need to route output fluid back to the feedback area. The feedback arrangement allows the valve to response quickly to changes in a commanded pressure increase by allowing the spool 37 to completely open the exhaust port 20 or supply port 22 to the output port 21, for a decrease or increase in pressure, respectively. The limit cycling phenomenon as the spool 37 overcomes the positive overlap with the exhaust and supply ports 20 and 22 is avoided by providing a controlled amount of leakage through the device by the use of clearances between spool 37 and housing 18 to provide a smoother transition from a closed to an open condition. A suitable amount of clearance is provided in the present embodiment with a total diametral clearance of 0.02 to 0.038 mm between spool 37 and bore 36.

Figure 5:
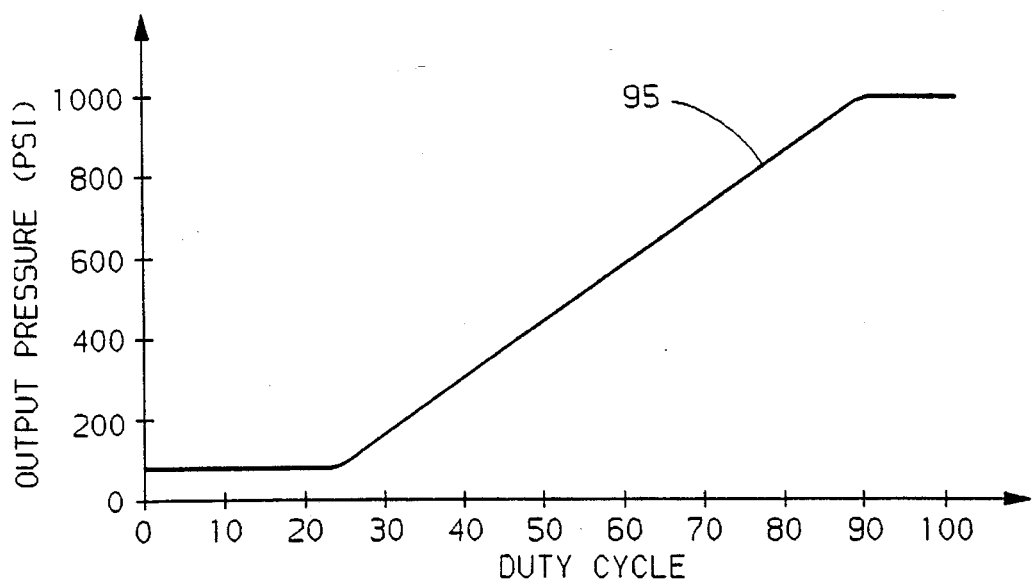
FIG. 5 is a graph of a performance curve of a pressure regulator according to the present invention.

Referring to FIG. 5, a performance curve 95 of a pressure regulator according to the present invention is illustrated. The linear portion of the curve 95 between approximately 25 and 85 percent of duty cycle provides proportional performance for pressure build-up and reduction in the load through ports 22 and 21. The curve 95 also demonstrates the repeatability of the pressure regulator and the minimal hysteresis in its performance.

What is claimed is:

1. A pressure regulator comprising:

a solenoid actuator including an armature that is substantially cylindrical in shape, the armature maintained in a centered orientation by a first bearing that is sleeve shaped and a second bearing that is ring shaped the first and the second bearings each encircling the armature and maintaining the armature in a centered orientation; and a pressure control valve combined in an integrated assembly with the solenoid actuator including an output port, a supply port and a spool that is positionable by the solenoid actuator, the spool having an axial bore and a cross bore intersecting the axial bore and a pin disposed in the axial bore wherein the spool is slidable relative to the pin and the output port is in constant fluid communication with the cross bore wherein the solenoid actuator and pressure control valve include a single spring that biases the spool toward the armature.

2. A pressure regulator comprising:

a solenoid actuator and a pressure control valve in an integrated assembly;

wherein the solenoid actuator includes an armature that is substantially cylindrical in shape and has a first end that is frusto-conical in shape and a second end, a rod extending from the first end, a rear bearing that is ring shaped near the second end of the armature, a sleeve bearing that is tubular shaped disposed around the armature, a primary plate adjacent the sleeve bearing and disposed about the armature, the primary plate and the first end of the armature defining a primary air gap therebetween, a secondary plate disposed about the armature between the rear bearing and the sleeve bearing including a groove that carries the rear bearing, the secondary plate and the armature defining a secondary air gap therebetween wherein the ring bearing and the sleeve bearing each encircle the armature and together maintain the armature in a centered orientation; and wherein the pressure control valve includes a sliding spool with a first end contacting the rod and a second end having an axial bore therein.

3. A pressure regulator according to claim 2 wherein the sliding spool includes a cross bore intersecting the axial bore.

4. A pressure regulator according to claim 2 wherein the first end of the armature forms an included angle of sixteen degrees.

5. A pressure regulator according to claim 2 further comprising a pin disposed in the axial bore of the sliding spool.

6. A pressure regulator comprising:

a solenoid actuator and a pressure control valve in an integrated assembly;

wherein the solenoid actuator includes a coil, an armature that is substantially cylindrical in shape and has a first end that is frusto-conical in shape and a second end, a rod extending from the first end, a rear bearing that is ring shaped near the second end of the armature, a sleeve bearing that is tubular shaped disposed around the armature, a primary plate adjacent the sleeve bearing and disposed about the armature, the primary plate and the first end of the armature defining a primary air gap therebetween, a secondary plate disposed about the armature between the rear bearing and the sleeve bearing, the secondary plate and the armature defining a secondary air gap therebetween wherein the rear bearing and the sleeve bearing encircle the armature and together maintain the armature in a centered orientation;

wherein the pressure control valve includes a sliding spool with a first end contacting the rod and a second end having an axial bore therein and a pin disposed in the axial bore having a cross-sectional area with a cross bore intersecting the axial bore, a housing disposed about the sliding spool having supply, exhaust and output ports therethrough the supply and exhaust ports being normally closed from one another by the spool and the output port being in constant fluid communication with the cross bore and axial bore; and wherein the spool is positionable by the solenoid actuator such that the first end of the armature in cooperation with the primary plate develop a force proportional to an input current in the coil during positioning of the spool to open or close the supply port to the output port wherein the input current is supplied by an electrical circuit that includes a zener diode that applies a negative voltage spike upon the cessation of a signal pulse resulting in a rapid drop in the force so that fluid pressure acting on an area of sliding spool in the cross bore substantially equal to the cross-sectional area of the pin to move the sliding spool to close the supply port to the output port.

7. A pressure regulator comprising:

a solenoid actuator and a pressure control valve in an integrated assembly;

wherein the solenoid actuator includes an armature that is substantially cylindrical in shape and has a first end that is frusto-conical in shape and a second end, a rod extending from the first end, a rear bearing that is ring shaped near the second end of the armature, a sleeve bearing that is tubular shaped disposed around the armature, a primary plate adjacent the sleeve bearing and disposed about the armature, the primary plate and the first end of the armature defining a primary air gap therebetween, a secondary plate disposed about the armature between the rear bearing and the sleeve bearing including a groove that carries the rear bearing, the secondary plate and the armature defining a secondary air gap therebetween wherein the ring bearing and the sleeve bearing each encircle the armature and together maintain the armature in a centered orientation; and wherein the pressure control valve includes a sliding spool with a first end contacting the rod and a second end having an axial bore therein and a pin disposed in the axial bore of the sliding pool wherein the pressure control valve includes a housing with a cylindrically stepped outer profile of successively increasing diameter toward the solenoid actuator.

8. A pressure regulator comprising:

a solenoid actuator and a pressure control valve in an integrated assembly;

wherein the solenoid actuator includes a coil, an armature that is substantially cylindrical in shape and has a first end that is frusto-conical in shape and a second end, a rod extending from the first end of the armature, a rear bearing that is ring shaped near the second end of the armature, a sleeve bearing that is tubular shaped disposed around the armature, a primary plate adjacent the sleeve bearing and disposed about the armature, the primary plate and the first end of the armature defining a primary air gap therebetween, a secondary plate disposed about the armature between the rear bearing and the sleeve bearing, the secondary plate and the armature defining a secondary air gap therebetween;

wherein the pressure control valve includes a spool positionable by the solenoid actuator to alternatively open paths of fluid communication between an output port and an exhaust port or the output port and a supply port wherein a range of positions of the spool provides a positive overlap where the output port is closed to both the exhaust port and the supply port and wherein a controlled amount of fluid leakage occurs as the spool approaches a position where the path of fluid communication between the output port and the supply port begins to open such that an abrupt flow gain as the positive overlap is overcome is smoothed the controlled amount of fluid leakage provided by a specifically selected diametral clearance around the spool and wherein the spool has an axial bore and a cross bore intersecting the axial bore and a pin disposed in the axial bore wherein the spool slides relative to the pin and the output port is in constant fluid communication with the cross bore and the axial bore such that an output fluid pressure forces the spool against the rod of the solenoid actuator.

\* \* \* \* \*